(12) United States Patent
Haase

(10) Patent No.: US 12,105,049 B2
(45) Date of Patent: Oct. 1, 2024

(54) METHOD FOR THE ANALYTICAL MEASUREMENT OF SAMPLE MATERIAL ON A SAMPLE SUPPORT

(71) Applicant: Bruker Daltonics GmbH & Co. KG, Bremen (DE)

(72) Inventor: Andreas Haase, Bremen (DE)

( * ) Notice: Subject to any disclaimer, the term of this patent is extended or adjusted under 35 U.S.C. 154(b) by 339 days.

(21) Appl. No.: 17/739,251

(22) Filed: May 9, 2022

(65) Prior Publication Data

US 2022/0397551 A1   Dec. 15, 2022

(30) Foreign Application Priority Data

Jun. 10, 2021 (DE) .......................... 102021114934.7

(51) Int. Cl.
| | | |
|---|---|---|
| *G01N 27/62* | (2021.01) | |
| *G01N 27/623* | (2021.01) | |
| *H01J 49/00* | (2006.01) | |
| *H01J 49/16* | (2006.01) | |
| *H01J 49/40* | (2006.01) | |

(52) U.S. Cl.
CPC ........ *G01N 27/623* (2021.01); *H01J 49/0031* (2013.01); *H01J 49/164* (2013.01); *H01J 49/40* (2013.01)

(58) Field of Classification Search
CPC .. G01N 27/623; H01J 49/0031; H01J 49/164; H01J 49/40
USPC ................................ 250/281, 282, 283, 288
See application file for complete search history.

(56) References Cited

U.S. PATENT DOCUMENTS

| | | | |
|---|---|---|---|
| 2003/0136906 A1 | 5/2003 | Marsh | |
| 2004/0183009 A1 | 9/2004 | Reilly et al. | |
| 2005/0242277 A1* | 11/2005 | Russell ................. | H01J 49/164 |
| | | | 250/282 |

(Continued)

FOREIGN PATENT DOCUMENTS

| | | |
|---|---|---|
| CN | 212542353 | 2/2021 |
| GB | 2574709 A | 5/2022 |

OTHER PUBLICATIONS

Antonín Bednařík et al., "Rapid Matrix-Assisted Laser Desorption/Ionization Time-of-Flight Mass Spectrometry Imaging with Scanning Desorption Laser Beam", Anal. Chem. 2014, 86, 2, 982-986.

(Continued)

*Primary Examiner* — Nicole M Ippolito
(74) *Attorney, Agent, or Firm* — Benoît & Côté, Inc.

(57) ABSTRACT

Disclosed is a method for analytically measuring sample material deposited on a sample support surface, comprising: (a) defining a plurality of regions on the surface, several of which are in contact with sample material, (b1) sampling sections of sample on a region using a desorbing beam to generate desorbed molecules, which are ionized and transferred to an analyzer, (b2) in so doing, sweeping the region by changing an orientation setting of the beam relative to the surface along a non-rectilinear trajectory on the region selected from a plurality of predefined, non-rectilinear trajectories while keeping the support in one position, (c) transitioning from a swept region to a region to be swept next using spatial adjustment of the support, and (d) repeating steps (b1), (b2), and (c) until a predetermined termination condition is fulfilled. A system for analyzing ions, having an ion generation device and a control unit is also disclosed.

13 Claims, 5 Drawing Sheets

(56) References Cited

U.S. PATENT DOCUMENTS

| | | |
|---|---|---|
| 2006/0071160 A1 | 4/2006 | Haase et al. |
| 2006/0186332 A1 | 8/2006 | Haase et al. |
| 2008/0006770 A1* | 1/2008 | Shiea ............... H01J 49/165 |
| | | 250/288 |
| 2008/0017793 A1 | 1/2008 | James et al. |
| 2013/0056628 A1 | 3/2013 | Holle et al. |
| 2019/0362957 A1* | 11/2019 | Hakala ............... G01N 1/40 |
| 2019/0362958 A1 | 11/2019 | Böhm |
| 2021/0333173 A1* | 10/2021 | Sandkuijl ........... G01N 21/6456 |

OTHER PUBLICATIONS

Antonín Bednařík et al., "MALDI MS Imaging at Acquisition Rates Exceeding 100 Pixels per Second", J. Am. Soc. Mass. Spectrom. (2019) 30:289-298.

Tingting Fu, "3D and High Sensitivity Micrometric Mass Spectrometry Imaging", Analytical chemistry, Université Paris-Saclay, 2017.

\* cited by examiner

METHOD FOR THE ANALYTICAL MEASUREMENT OF SAMPLE MATERIAL ON A SAMPLE SUPPORT

BACKGROUND OF THE INVENTION

Field of the Invention

The invention relates to methods for the analytical measurement of an extended or flat sample material which is deposited on a sample support surface, where sample material is converted into the gaseous phase by means of desorption so as to be spatially resolved, and from this material charged species or analyte ions are generated and then transferred to an analyzer for further analysis. The method is particularly suitable for imaging mass spectrometry of (thin) tissue sections, either with or without prior mobility separation.

Description of the Related Art

The prior art is explained in this introduction with reference to a specific aspect. This shall not be understood as a limitation to the disclosure of the invention that follows, however. Useful further developments and modifications of what is known from the prior art can also be applied above and beyond the comparatively narrow scope of this introduction, and will easily be evident to the practitioner skilled in the art in this field after reading the disclosure of the invention which follows this introduction.

Imaging mass spectrometry is essentially concerned with the scanning of a flat sample, e.g., a microtomed (thin) tissue section, by means of a desorbing beam, which releases spatially resolved analyte molecules from the flat sample and transfers charged molecular species or analyte ions generated from said molecules to a mass analyzer, for example a time-of-flight analyzer (TOF). Examples are matrix-assisted laser desorption/ionization (MALDI) or ionization by means of primary ion bombardment (secondary ion mass spectrometry, SIMS) coupled to a time-of-flight analyzer, MALDI-TOF and SIMS-TOF, respectively. The spatially resolved measurement data can be used to compile and display a distribution map of the different analyte molecules across the flat sample.

Imaging mass spectrometry setups originally operated with a stationary beam guide and an x-y translation stage which could be moved in two dimensions, and on or in which the sample support with the flat sample was located. To scan the flat sample with spatial resolution in such a setup, the translation stage was moved at regular intervals so that a different region of the flat sample was in the focus of the desorbing beam after each movement of the stage. As a movement mechanism, translation stages are relatively sluggish, and the movement of the stage is therefore quite time-consuming because, when taken together, the flat sample, the sample support, and the stage itself amount to quite a large mass that must be moved with regular repetition over a comparatively short distance of a few tens to a hundred micrometers (in a stop-and-go cycle). After each movement has ended, oscillations and vibrations occur in the heavy stage setup, which must first subside before scanning with the desorbing beam can continue, as otherwise the positional accuracy of the desorption process would be affected. In addition, the positioning accuracy of commercially available translation stages is in the single-digit micrometer range, around 2.5 to 3 micrometers, which limits the spatial resolution that can be achieved. Although piezo translation stages with better positioning accuracy are known, they are very expensive to purchase and therefore not suitable for industrial production.

One example of this mode of operation can be found in the patent publication US 2008/0017793 A1. This discloses a method for dynamic mass spectrometric pixel imaging which involves directing a laser beam onto a sample that is to be scanned so that the laser beam releases analytes from the sample. The laser beam and the sample are then shifted relative to each other so that, essentially, the laser beam continuously follows a predefined path on the sample in order to release analytes from the sample along this predefined path. This is followed by a mass analysis of the analytes released.

Stationary positioning of the sample support, together with the flat sample deposited thereon, and scanning the sample surface by changing the orientation of the desorbing beam is equivalent, in kinematic terms, to purely moving the stage and using a desorbing beam with stationary orientation. One example is given in the patent publication US 2004/0183009 A1, which shows a MALDI mass spectrometer containing a laser beam guidance arrangement with which the movement of a laser focus across the MALDI sample being analyzed can be controlled. The laser beam guidance arrangement can contain a mirror arrangement comprising a pair of independently controlled mirrors. The first mirror can move the laser focus along the x-axis of the MALDI sample, while the second mirror can move the laser focus along the y-axis of the MALDI sample. The objective is particularly to detect areas of the sample with very high yield (sweet spots). There are practical limits to the area on a sample support which can be scanned purely by means of a beam shift, since ion generation and ion transfer into a connected analyzer are adversely affected to an increasing extent as the angle of incidence of the beam decreases and flattens relative to the sample support surface. Particularly when a typical time-of-flight analyzer with axial injection of the ions is used, a maximum displacement of around 100 micrometers from a rectilinear time-of-flight axis is possible without any further compensation of the ion beam generated.

Moreover, combinations of stage movement and change in beam orientation became known, e.g., from the patent publication DE 10 2011 112 649 A1 (corresponds to GB 2 495 805 A and US 2013/0056628 A1), which relates to mass spectrometers with sample ionization by matrix-assisted laser desorption (MALDI). Here, the samples are located on a movable support plate, where they are irradiated with a pulsed laser whose point of impingement on the continuously moving support plate is changed via a system of rotatable mirrors.

One example of an operating mode with combined intermittent stage movement and change of beam orientation can be found in the poster publication by Antonin Bednařík et al., *High throughput MS imaging using a fast scanning mirror*, exhibited at the 60th ASMS Conference, May 20-24, 2012 in Vancouver, Canada. This publication relates to a prototype of a linear time-of-flight mass spectrometer with high throughput and a single, fast, precision scanning mirror, where fast and precise mirror adjustment of the desorption laser within a few millimeters replaces sample stage movement along one spatial direction. Larger areas can be visualized by joining individual images together. This publication was followed by two specialist articles from the same research group with similar, further developed content:

Antonin Bednařík et al., Anal. Chem. 2014, 86, 2, 982-986 and Bednařík et al., J. Am. Soc. Mass. Spectrom. (2019) 30:289-298.

A description for different operating modes with purely stage movement and stationary beam orientation, and with combined intermittent stage movement and change to the beam orientation, for a SIMS-TOF mass spectrometer can be found in the dissertation of Tingting Fu (3*D and High Sensitivity Micrometric Mass Spectrometry Imaging*. Analytical chemistry, Université Paris-Saclay, 2017. English. NNT: 2017SACLS218. tel-01699065v2). The scientist strives to obtain a better understanding of ion production under cluster ion bombardment, to investigate the MS/MS capability of a parallel imaging MS/MS spectrometer (PHI nanoTOF II), and also to use SIMS-TOF to map important wood metabolites with high spatial resolution.

The patent publication DE 10 2018 112 538 B3 (corresponding to GB 2 574 709 A and US 2019/0362958 A1) relates to time-of-flight mass spectrometers with pulsed ionization of samples, for example by matrix-assisted laser desorption (MALDI), where the samples are located on a sample support and are irradiated and ionized one after the other in a grid by a position-controlled desorption beam. An ion-optical puller lens arrangement is positioned in front of the sample support, with at least one of the lens diaphragms in the arrangement being subdivided into segments, and a voltage supply being able to supply the segments, or some of them, with different voltages, depending on the impact position of the desorption beam on the support plate. It is then possible to virtually shift the effective ion-optical focusing center of the lens away from the axis, and to focus an ion beam, which is generated off the real lens axis, into a beam which runs essentially parallel to the real lens axis, with no time phase shift for ions of the same mass. This beam can be brought back onto the axis by an x/y deflection unit, for example for operating the time-of-flight mass spectrometer with a reflector.

Given the explanations above, there is a need to accelerate the measurement of sample material which is deposited on a sample support. There is furthermore a need to reduce unnecessary wear and tear on the assemblies involved in the relative movement of desorbing beam and sample support. Further objectives that can be achieved by the invention will be immediately clear to the person skilled in the art from reading the disclosure below.

SUMMARY OF THE INVENTION

The invention relates to a method for the analytical measurement of sample material which is deposited on a sample support surface, comprising the steps: (a) defining a plurality of regions on the sample support surface, several of which are in contact with sample material, (b1) sampling sections of a sample on a region using a desorbing beam to generate desorbed molecules, which are ionized and transferred to an analyzer, (b2) in so doing, sweeping the region by changing an orientation setting of the desorbing beam relative to the sample support surface along a non-rectilinear trajectory on the region selected from a plurality of pre-defined, non-rectilinear trajectories while keeping the sample support in one position, (c) transitioning from a swept region to a region to be swept next by means of spatial adjustment of the sample support, and (d) repeating steps (b1), (b2), and (c) until a predetermined termination condition is fulfilled.

According to the present disclosure, the movement mechanism for the sample support and the device for changing the orientation of the desorbing beam are advantageously operated alternately in accordance with a predefined pattern to scan sample material that is distributed over an area on the sample support as rapidly and with as little wear and tear as possible. The desorbing beam assembly particularly contains an electro-optical adjustment device for changing the spatial orientation of the beam relative to the sample support surface in two spatial directions along a plane parallel to the sample support surface. Said device operates quickly and with comparatively small adjustments in the three-digit nanometer to single-digit micrometer range. The sample support assembly particularly contains a movement mechanism for spatial movement of the sample support relative to the desorbing beam. This mechanism, in contrast, operates slowly because of the comparatively large mass to be moved and requires a rest period after the movement has taken place, e.g., around 0.8 seconds, so that any oscillations or vibrations which could shake the sample support and impair the desorption process can subside.

The desorbing beam is moved non-rectilinearly across a region in a plane, essentially parallel to the sample support surface on which the sample material has been deposited, while the sample material is sampled with the desorbing beam. At the latest when the movement radius of the electro-optical adjustment device for sweeping a region in two spatial directions along a plane parallel to the sample support surface has reached its limit, the movement mechanism can be activated to scan a further region, for example an adjacent region. The number of time-consuming stepwise movements of the sample support assembly can thus advantageously be reduced. It must also be considered that, when a time-of-flight analyzer with axial ion injection is used without any compensation of the ion beam generated, as is described in the patent publication DE 10 2018 112 538 A1, for example, any displacement of the desorbing beam from an ion-optically optimal center should not exceed 100 micrometers to avoid errors in the time of flight measurement.

In preferred embodiments, the region in step (b2) can be swept between a first orientation and a last orientation of the desorbing beam relative to the sample support surface, wherein after each transitioning in step (c), a sweeping of the next region begins with the last orientation of the desorbing beam in each case. In other words, the desorbing beam can sweep the region in step (b2) starting from a first impingement position through to a last impingement position on the region, wherein, after each transitioning in step (c), a sweeping of the next region begins from a first impingement position on this region, which corresponds to the last impingement position on the region previously swept. According to this embodiment, the need to reset the orientation of the desorbing beam after or during each transitioning from one region to the next, to a uniform orientation relative to the sample support surface can be obviated by simply retaining the beam orientation last set (the last impingement position, where applicable) so that the sweeping of the area of each sequentially targeted region does not start with the same setting of the beam orientation relative to the sample support surface (the same impingement position, where applicable). With this advantageous operating mode, the wear and tear on the electro-optical assemblies used for adjusting the beam orientation over and above the movements necessary for the scanning of the sample material can be reduced. In addition, the sweeping and sampling can be continued immediately on completion of the adjustment of the movement mechanism during the transitioning from one region to the next (including a period to allow interfering oscillations and vibrations to subside, where necessary) without having to wait for the desorbing beam to be reoriented, which provides an additional time advantage. If required, this particularly preferred embodiment can even be combined with a steady or continuous movement of the sample support, as is known from the patent publication DE 10 2011 112 649 A1 mentioned in the introduction, and which shall therefore also be considered to be part of the disclosure.

In various embodiments, the desorbing beam can be an ion beam or a light beam. An ion beam can be a primary ion beam for the bombardment of the sample material, which leads to the formation of secondary ions (SIMS). The ion beam can have a continuous or pulsed ion current. A light beam can be a beam of coherent light, e.g., from a solid state laser (in particular Nd:YAG), a gas laser (nitrogen, $N_2$), or a light-emitting laser diode. For this photo-optical desorption, the sample material can have been specially prepared to exhibit the best possible light absorption properties, e.g., with a matrix material for MALDI ionization. The light beam can have a continuous or pulsed flow of photons. If required, the ionization process can be assisted by post-ionization procedures after the desorption, e.g., MALDI-2 (Jens Soltwisch et al., Science, 10 Apr. 2015•Vol 348 Issue 6231, 211-215) or secondary neutral mass spectrometry (SNMS), for example using a laser pulse which is directed laterally into the desorption cloud shortly after the desorption, before the ions are transferred into an analyzer. The light beam (and the laser beam in particular) can have a modified beam cross-section e.g., with several separate intensity peaks, as described in the patent publications DE 10 2004 044 196 A1 (corresponds to GB 2 421 352 A and US 2006/0071160 A1) and DE 10 2005 006 125 A1 (corresponds to GB 2 423 187 A and US 2006/0186332 A1) using the example of a laser beam.

Each region can have a plurality of area elements or pixels, and the desorbing beam can sample a sample section on an area element along a desorption path selected from a plurality of predefined desorption paths. The selected desorption path is preferably non-rectilinear, to exploit the comparatively fast and easy adjustment of the orientation of the desorbing beam in two spatial directions along a plane parallel to the sample support surface for the purpose of scanning the area element. Each area element, or each region, can have a plurality of (mutually separate or distanced) sampling sites if the desorbing beam is operated in discontinuous or pulsed mode. A sampling site can be irradiated with one or more pulses to generate a desorbate which may contain charged species or analyte ions. An area element or pixel is usually the unit of smallest spatial resolution in a graphic representation of the data measured over a large area. The data from the area element or from a region can be combined even if it contains several separate sampling sites. A retrospective reduction of the spatial resolution in a graphic representation or distribution map of the molecular content of the sample material is always possible in the post-processing by combining measurement data which was acquired spatially separately, e.g., from different sampling sites.

The desorption path selected on an area element can contain a plurality of changes of direction on an area element. The changes of direction can particularly comprise (almost) right angles or other acute or obtuse angles. The changes of direction can be abrupt, i.e., at an angle, but also almost continuous, e.g., along a circular trajectory, cycloid, or any other type of curved trajectory.

The sample material can be a tissue section. The molecular content of a thin tissue section is preferably measured with spatial resolution in order to create and visualize a distribution map of molecules of interest, e.g., biomolecules such as peptides, lipids (phospholipids and glycolipids), oligosaccharides, sterols, glycans, secondary metabolites, or fat-soluble vitamins, but also other, possibly non-tissue molecules such as active medicinal agents (pharmaceutical substances) and/or their degradation products. Specialists will consider that the sample material can also have a tissue microarray (TMA) or an array of separate preparations, for example sample material which is matrix-prepared as per the dried droplet method for subsequent MALDI ionization. The regions can then include lyophobic or hydrophilic regions on a metallic or otherwise electrically conductive sample support, which are separated from each other by lyophilic or hydrophobic regions on the sample support and thus isolated, as in the form of the AnchorChip™ plates from Bruker.

In various embodiments, the regions and/or area elements can have a polygonal contour. It is thus possible to generate an array of regions and/or area elements which almost completely covers the basic area of the sample support and the sample material deposited thereon. Examples are rectangles, such as squares, and also polygons with a greater number of angles, such as hexagons. The contours of the regions and/or area elements can be uniform across the whole sample support. It is, however, also possible in principle to define regions and/or area elements of varying shapes in the same measurement, if this is expedient for the application. It is also possible to design the contours of regions and area elements differently, e.g., uniformly rectangular or square for the regions, and uniformly hexagonal for the area elements in the individual regions. The freedom of scope for a specialist is virtually unlimited.

In different embodiments, the analyzer can be a mobility analyzer, mass analyzer, or combined mobility-mass analyzer. In general, the terms ion-spectrometric analyzers and measurement methods can be used, which can include mobility separation, mass separation, or a combination of both.

An ion mobility analyzer separates charged molecules or molecular ions according to their collision cross-section to charge ratio, sometimes designated by $\Omega/z$ or $\sigma/z$. The basis for this is the interaction between the ionic species and an electric field, which couples with the charge of the ions, and the simultaneous effect of a buffer gas, which affects the average cross-sectional area of the ion. Already known are, particularly, drift-tube mobility separators with static electric field gradients, which drive ions through an essentially stationary gas. Here, the drift velocity of an ionic species is given by the propulsive force of the electric field and the decelerating force of the collisions with the gas particles. Equally common are trapped ion mobility separators (TIMS) with a continuous laminar gas flow driving the ions forward, said gas flow being counteracted by a gradually changing electric field gradient with correspondingly variable deceleration force. Traveling-wave mobility separators are also worthy of mention.

A mass analyzer, on the other hand, separates charged molecules or molecular ions according to their mass-to-charge ratio, usually designated as m/z. In addition to the aforementioned time-of-flight analyzers, which can be equipped with linear as well as reflector setups, other types of mass-dispersive separators can also be used, e.g., quadrupole mass filters (single quads), triple quadrupole analyzers ("triple quads"), ion cyclotron resonance (ICR) cells, Kingdon-type analyzers such as the Orbitrap® (Thermo Fisher Scientific), and others. Separators of the aforementioned types can, of course, be coupled to enable ionic species to be separated multidimensionally, i.e., according to more than one physico-chemical property such as m/z and Ω/z or σ/Z.

The orientation of the desorbing beam can be changed using a plurality of deflection elements. For a light-optical beam, a system of reflective elements such as mirrors, refracting elements such as prisms, and/or electro-optical or acousto-optical deflection elements such as electro-optical crystals, can be used, which is able to change or shift a position where the desorbing beam impinges on the sample support surface, or on the sample material thereon, in two spatial directions along a plane parallel to the sample support surface, e.g., by tilting or otherwise changing the spatial orientation. For an ion beam, a system of deflection electrodes supplied with a potential can be used, which surround the ion beam path and can generate variable potential gradients in the space between the two electrodes of a pair. One example is two electrode pairs, each at 90° to the other. If the electric potential applied to the two opposing electrodes of a pair is the same, a primary ion beam passing through this pair will not experience any lateral deflection. If the electric potentials are not the same, the primary ions are deflected as a function of the potential difference during flight.

The trajectory selected can contain a plurality of changes of direction on a region and/or area element. This allows a flat or two-dimensional region of the sample material to be scanned by changing the orientation of the desorbing beam rapidly and with very little wear and tear, since the number of stepwise movements of the quite heavy sample support assembly can be correspondingly reduced. The changes of direction can particularly comprise (almost) right angles or other acute or obtuse angles. The changes of direction can be abrupt, i.e., at an angle, but also almost continuous, e.g., along a circular trajectory, cycloid, or any other type of curved trajectory. The trajectory of the region to be swept next can correspond to the trajectory of the region already swept but in the opposite direction. In general, trajectories can differ from region to region if this is expedient for the application.

In various embodiments, the sample support can be spatially shifted by means of a translation stage. Preferable are xy-translation stages that are designed to translate or move the sample support, including the sample material placed on or in the translation stage, in two spatial directions parallel to a plane of the sample support surface. The larger the movement radius of the adjustment device for changing the orientation of the desorbing beam, the lower the requirements regarding the smallest step size of the translation stage can be, since the movement of the desorbing beam can cover the surface regions between two activations of the translation stage. A translation stage usually has step sizes in the range of two- to three-digit micrometers. In various embodiments, the movement mechanism for the sample support, particularly implemented in or on the translation stage, can also include a means of movement along a third spatial direction (z-axis), e.g., to adjust an optimum focal point of a desorbing beam to accommodate the sample material of varying thickness or height.

In various embodiments, the information gained with the analyzer from the regions and/or area elements sampled can be combined to form a spatial distribution map of ions, or underlying molecular substrates, across the sample material. This makes it possible to illustrate the distribution of the sample's own molecules as well as those foreign to it across the sample material, in the manner of non-optical microscopy with a label-free measurement, in contrast to staining methods in optical microscopy, for example.

The termination condition can be fulfilled when all regions and/or area elements have been swept and sampled. In extreme cases, the sampling can go so far that the sample material is more or less completely removed by the effect of the desorbing beam on all regions and/or area elements so that the desorbing beam would not be able to continue generating desorbed molecules. A further example of a termination condition can be when a number of regions of special interest have been swept and sampled, this number being less than the total number of defined regions, so sections of sample material remain unmeasured, e.g., regions of different cell types in a (thin) tissue section. The termination condition can also be defined as a malfunction during execution of the method, e.g., because a mirror has jammed.

The invention also relates to a system for the analysis of ions comprising an ion generation device and a control unit, which is designed and configured to execute a method as hereinbefore described on the ion generation device.

BRIEF DESCRIPTION OF THE DRAWINGS

The disclosure can be better understood by referring to the following illustrations. The elements in the illustrations are not necessarily to scale, but are primarily intended to illustrate the principles of the disclosure (mostly schematically). In the illustrations, the same reference numbers designate corresponding elements in the different views.

DETAILED DESCRIPTION

While the invention has been illustrated and explained with reference to a number of embodiments, those skilled in the art will recognize that various changes in form and detail can be made without departing from the scope of the technical teaching, as defined in the attached claims.

Figure 1:
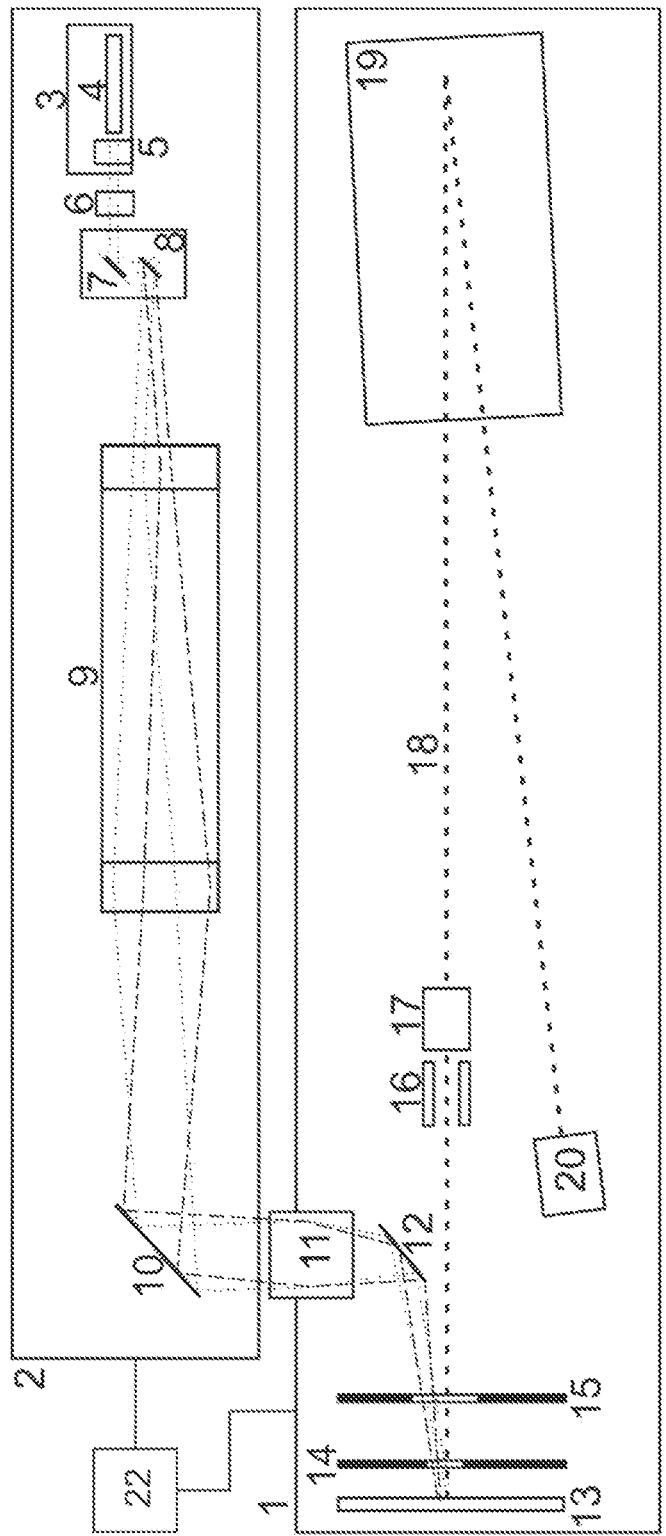
FIG. 1 shows schematically the design of a MALDI time-of-flight mass spectrometer which is suitable to execute methods according to principles of the present disclosure.

FIG. 1 is a schematic of a MALDI time-of-flight mass spectrometer (adapted from DE 10 2011 112 649 A1) with a time-of-flight analyzer (1), and a laser system (2) which uses a mirror system (7, 8) to control the orientation of the laser beam relative to the surface of the sample support (13) that carries the sample material. The usually pulsed laser beam is generated in the beam generation unit (3), which contains a laser crystal (4) and, if required, a device (5) for laser frequency multiplication. The laser beam is provided with intensity peaks in the pattern generator (6), and deflected in two spatial directions in the mirror system by two galvo mirrors (7) and (8) so that the position where the laser beam impinges on the sample support surface can be shifted. The deflected laser beam is then expanded in a Keplerian telescope (9) and shifted in parallel according to the angular deflection. The exiting laser beam is then directed via the mirror (10) into the object lens (11) at a reduced angle of deflection so as to be perfectly centered again. Depending on the angular deflection, the beam passes through the center of the object lens (11), but at slightly different angles, thus shifting the position at which it impinges on the sample support (13). It should be noted here that the beam guidance within a Keplerian telescope (9) is more complex and the illustration does not reproduce it realistically for reasons of simplicity, although the illustration does correctly reproduce the external effect of the telescope on the laser light beam.

The desorbed, charged molecules and ions generated in the desorption clouds of the impinging laser beam are accelerated by voltages on the diaphragms (14) and (15) to form an ion beam (18), which passes through the two deflection capacitors (16, 17) to correct its trajectory, and is focused onto the detector (20) by the reflector (19) (MALDI TOF arrangement). A control unit (22), which is suitable to implement the principle of the present disclosure and which can be appropriately programmed, communicates with both the time-of-flight analyzer (1) and the laser system (2) and coordinates their operation with respect to each other.

Figure 2:
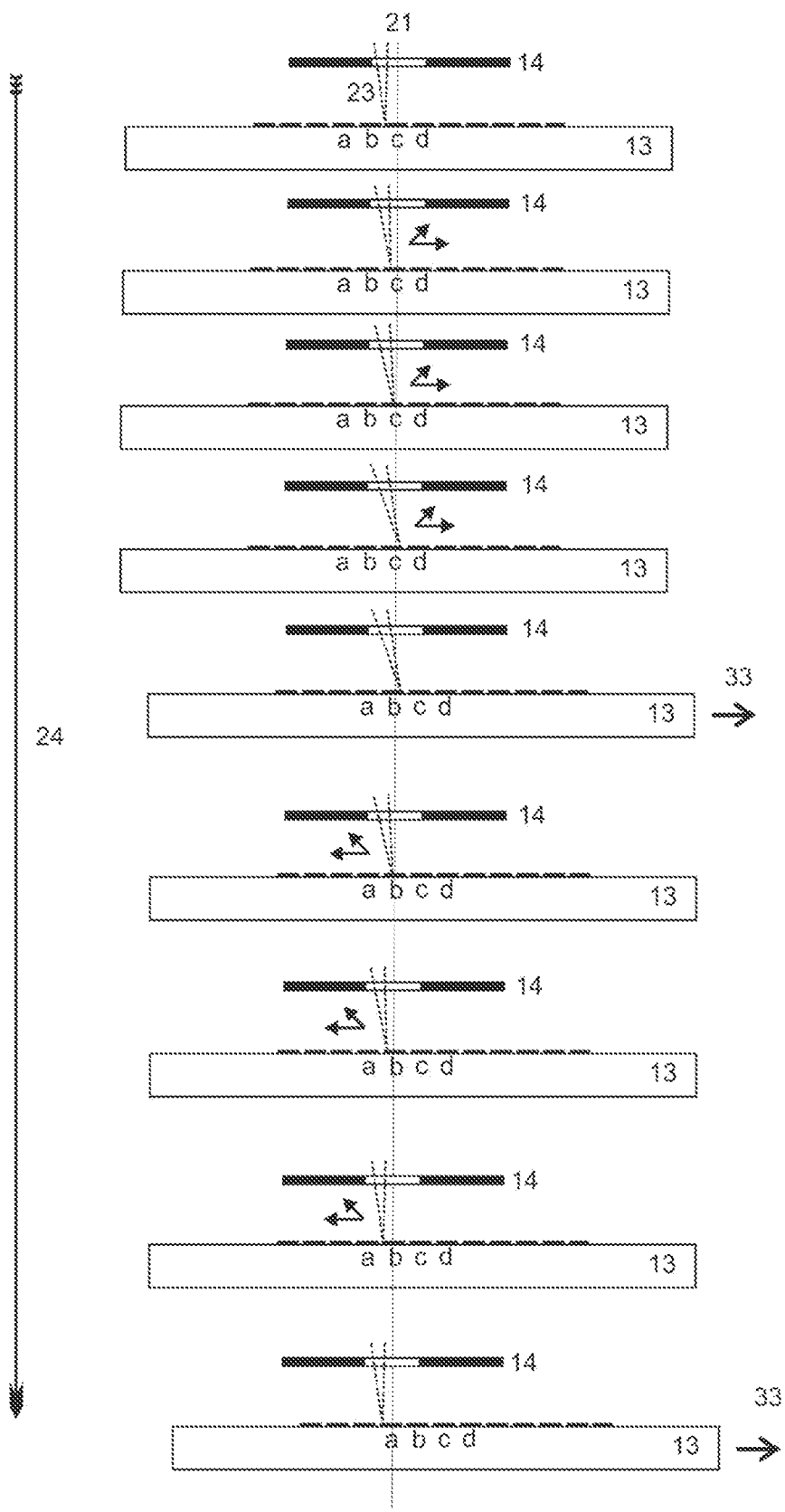
FIG. 2 is a schematic and sectional illustration of a scanning sequence with movements of a desorbing beam and a sample support relative to each other, as can be carried out in a MALDI time-of-flight mass spectrometer in FIG. 1, in a side view.

FIG. 2 is a schematic and sectional illustration of a scanning sequence with movements of a desorbing beam (23) and the sample support (13) relative to each other, as can be carried out in a MALDI time-of-flight mass spectrometer in FIG. 1, in a side view. Reference number (21) corresponds to an ion-optical axis along which charged species or analyte ions are accelerated onto a flight path by extraction voltages applied to a first acceleration diaphragm (14), see ion beam (18) in FIG. 1.

On the sample support (13), several regions (a, b, c, d, and others) are defined which subdivide sample material (not shown) deposited thereon, e.g., a (thin) tissue section prepared with a MALDI matrix, into several sections. Following the sequence (24) from top to bottom, the desorbing beam (23) is initially directed at the left edge of region (c). Sample material located there can be desorbed and ionized by the impinging desorbing beam (23), and then extracted along the ion-optical axis (21) by applying an electric extraction potential to the first accelerating electrode (14). Afterward, the orientation of the desorbing beam (23) is changed such that an adjacent site on region (c) is targeted. The sample support (13) remains stationary as this is happening. After two further sampling steps of region (c) using the desorbing beam (23), whose orientation has changed slightly while the position of the sample support (13) has remained stationary, a right-hand edge of region (c) is reached.

It should be pointed out here that the side view should not give the impression that, during sampling, region (c) is swept by the desorbing beam along only one spatial direction in a plane parallel to the sample support surface (in FIG. 2 from left to right, or right to left). According to the present disclosure, the comparatively low mass and hence fast change of orientation of the desorbing beam (23) in two spatial directions across the surface of the sample support (13) is exploited to minimize the number of sample support movements (arrow (33)) for the more or less complete scanning of extended or flat sample material. In the representation in FIG. 2, the second direction runs perpendicular to the picture plane, i.e., into the picture plane or out of it. This will be explained in more detail below with reference to FIGS. 3A-C.

When region (c) has been swept by adjusting the orientation of the desorbing beam (23) in two spatial directions parallel to the sample support surface and has thus been sampled at several sites, the sample support (13) can be moved to another position (arrow (33)) by means of its movement mechanism (not shown) so that a position at which the desorbing beam (23) impinges is located on an edge of a region (b) adjacent to the previously swept region (c) in this example. Following this sample support movement, the sweeping and sampling pattern for region (b) can be very similar to the pattern which was used to sweep and sample the previous region (c). However, it is advantageous not to change the orientation of the desorbing beam (23) relative to the sample support surface during the sample support movement (33), but to keep it as it is. In this preferred embodiment, the subsequent sweeping and sampling of region (b) then starts in an edge area on the right. This is then followed by several changes to the orientation of the desorbing beam (23) in the opposite direction (in the sequence (24) in FIG. 2, from right to left, including the movements perpendicular to the picture plane, which are only implied because of the side view), until the desorbing beam (23) is oriented towards a left edge of region (b) and the sample material located there has been sampled for a last time, for example.

The desorbing beam (23) remains in this last orientation setting until the sample support (13) has been moved into a subsequent position (arrow (33)), in which region (a) lies within the radius of movement of the desorbing beam (23). Here also, the position at which the desorbing beam (23) impinges for the subsequent sweeping and sampling of region (a) is initially at a left edge. It is thus possible to avoid unnecessary resetting of the orientation of the desorbing beam (23) during the sample support movement (33). The sweeping and sampling pattern of region (a) can be similar to the pattern used for region (c), but it can also be different.

Figure 3A:
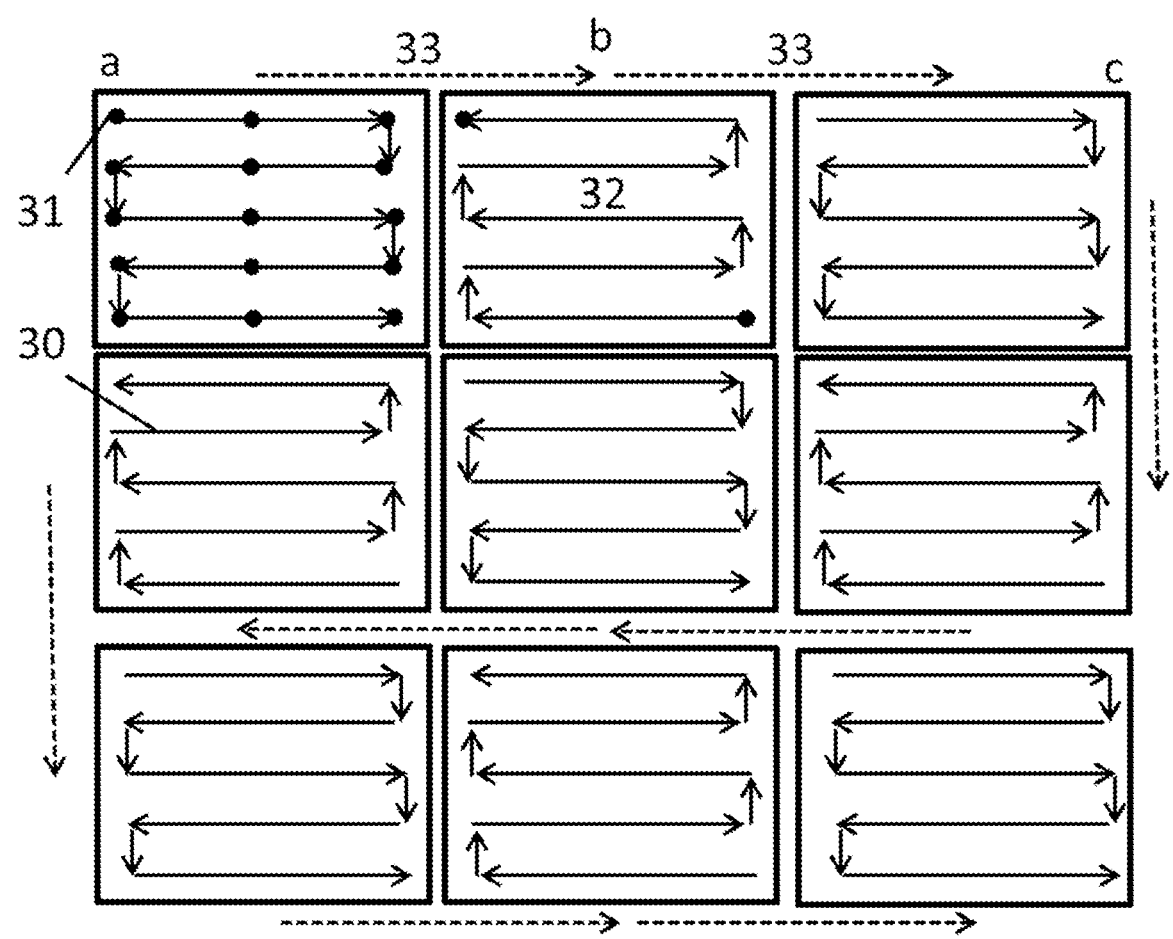
FIG. 3A shows example patterns of non-rectilinear trajectories of a desorbing beam across several regions, in a plan view.

FIG. 3A is a schematic illustration, by way of example, of the course of non-rectilinear trajectories (30) across a multiplicity of predefined regions (a, b, c, . . . ) with different (mutually separate) sampling sites (31) on the regions (a, b, c, . . . ), in a plan view. Solid arrows (32) within the regions (a, b, c, . . . ) indicate a movement direction of the sweeping when the orientation of the desorbing beam (not shown) is changed in relation to the sample support surface. Points (31) along the solid arrows (32) indicate the sampling sites of a desorbing beam operated in pulsed mode in the regions (a, b, c, . . . ). Information as to the abundance or quantity of charged species and analyte ions which are generated by the desorbing beam impinging on these sampling sites (31), can be combined on being registered by a detector of a mobility and/or mass spectrometer for a graphic representation of the molecular content, so that the regions (a, b, c, . . . ) serve as units of smallest spatial resolution in such representations.

As can be seen in FIG. 3A, the sweeping and sampling of a first region (a) starts in the top left-hand corner in the diagram and then follows a meandering or zig-zag course whilst executing several 90° changes of direction until reaching a position in the bottom right-hand corner. When the sweeping and sampling of the first region (a) is completed, the desorbing beam remains in its orientation relative to the sample support surface, and the movement mechanism of the sample support is adjusted stepwise (broken arrows (33) outside the regions) so that a further region (b) comes into the movement radius of the desorbing beam. The subsequent sweeping and sampling of the new region (b) starts at a position in the region corresponding to the position where the sweeping and sampling of the previous region (a) ended, in this example in the bottom right-hand corner. The sampling sites (31) in the second region (b), apart from the first and last ones, have been left out for reasons of clarity. In the present example, the desorbing beam follows non-rectilinear trajectories on the regions (a, b, c, . . . ) which run in the opposite direction in successive regions. This does not necessarily have to be the case, however. It is also possible to select an individual, non-rectilinear trajectory for the sweeping and sampling of the desorbing beam or other suitable patterns for each region (a, b, c, . . . ), as the person skilled in the art thinks useful for a specific application.

The time saving achieved with the procedure described here, compared with a setup with stationary beam orientation and xy-translation stage as the only movement mechanism, can be illustrated with a numerical example. The region (a) from FIG. 3A in this example comprises 15 sampling sites, so 14 stage movements would be necessary to fully scan the region (a). The waiting time for the oscillations and vibrations mentioned in the introduction to subside after a stepwise movement of the sample support by the corresponding components of the movement mechanism thus amounts to 14×(~)0.8 seconds=11.2 seconds. Changing the orientation of a desorbing beam of laser light, on the other hand, is much faster, i.e., 14×(~)0.002 seconds=0.028 seconds, a significant acceleration.

The load reduction on the electro-optical device for changing the orientation of the desorbing beam can also be illustrated by a numerical example. In each region, the electro-optical adjustment device has to change the direction of movement of the sweeping desorbing beam eight times from a first impingement point to a final impingement point on the region, in the example shown. If, during or after each transitioning from one region to the next, the orientation of the desorbing beam were to be reset consistently relative to the sample support surface or to a consistent impingement position in the region, as the prior art suggests, this would require one additional movement or adjustment, i.e., nine instead of eight changes of movement, an increase of 12.5 percent. Especially when scanning a (thin) tissue section measuring 1 cm$^2$ in area with regions 10 μm×10 μm=100 μm$^2$ in area, 100 million regions would have to be scanned according to the pattern from FIG. 3A, which would lead to 12,500,000 essentially unnecessary movements of the electro-optical adjustment device of the desorbing beam. By adapting the scanning pattern in accordance with the preferred embodiment of the present disclosure, the service life of the adjustment device, which is limited by wear and tear, can be accordingly extended.

Figure 3B:
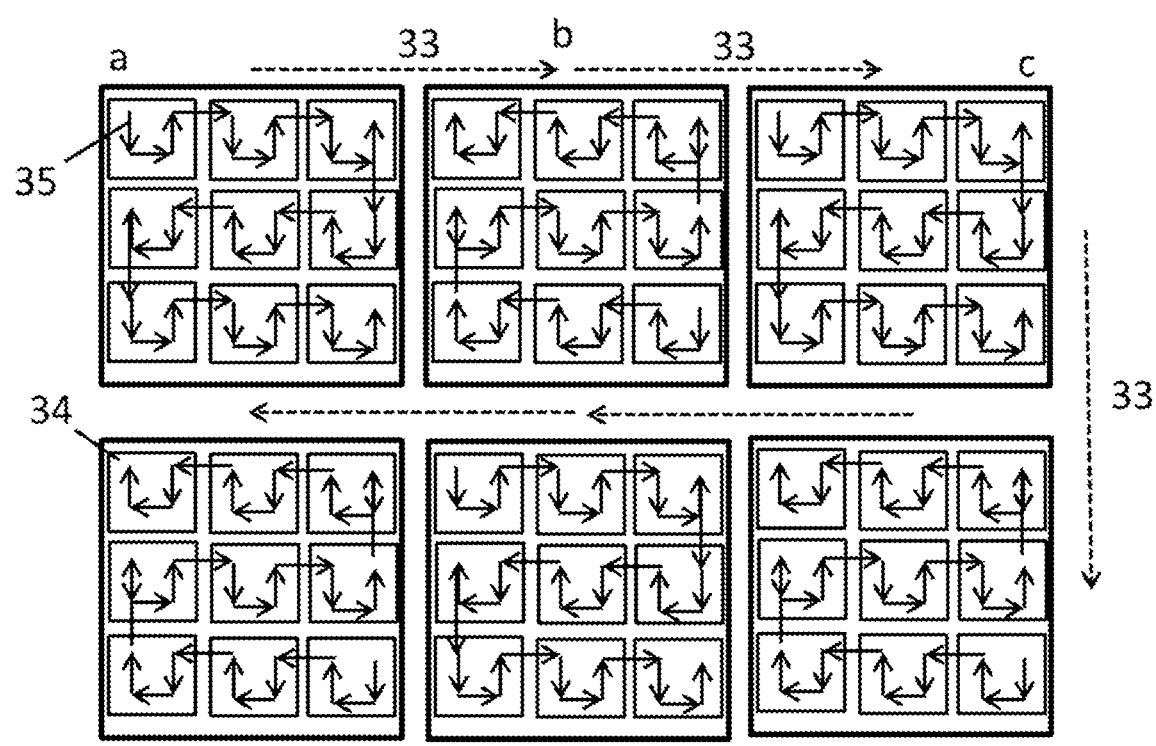
FIG. 3B shows example patterns of non-rectilinear desorption paths of a desorbing beam across several area elements in one region, as well as the non-rectilinear trajectories across the regions containing the area elements, likewise in plan view.

FIG. 3B shows a further example pattern for the sweeping and sampling of regions containing sample material in accordance with the principles of the present disclosure. In contrast to the example in FIG. 3A, FIG. 3B shows not only a subdivision into defined regions (a, b, c, . . . ), but also a plurality of area elements (34) in each region. The area elements (34) can serve as units of smallest spatial resolution for a graphic representation of the measured molecular content from the sample material (pixel). The area of an area element (34) is swept and sampled according to a predetermined non-rectilinear desorption path (35, solid arrows) so that a predetermined, non-rectilinear trajectory of the sweeping and sampling results across the multiplicity of area elements (34) in a region. While transitions from one region to the next are being made using the movement mechanism of the sample support, the many area elements in a region are scanned solely by changing the orientation of the desorbing beam in two spatial directions parallel to a surface of the sample support.

Similar to the approach from FIG. 3A, each desorption path (35) in this example contains a plurality of direction changes, according to which a rectangular oscillation-type "micro-movement" across the individual area elements (34) is superimposed on a "macro-movement" of the meandering or serpentine scanning of the regions (a, b, c, . . . ). The transitioning from a last area element in one row to an adjacent area element in the next row involves a short movement of the desorbing beam in the opposite direction. This does not, however, present any problems due to the advantageous adjustment properties of the desorbing beam, and takes hardly any time. Sampling sites at which a pulsed desorbing beam can impinge have been omitted in FIG. 3B for reasons of clarity, but it is contemplated that at least one sampling of sampling material can take place along every solid arrow. The advantageous principle that each spatial adjustment of the sample support is carried out while maintaining an orientation of the desorbing beam is also realized in this example. In the grid of similar regions (a, b, c, . . . ) and similar area elements (34) in these regions which is shown here, this means that sweeping and sampling of a region begins in an orientation of the desorbing beam relative to the sample support surface, and thus an impingement position on the sample support, in which the sweeping and sampling of a previous region ended.

Figure 3C:
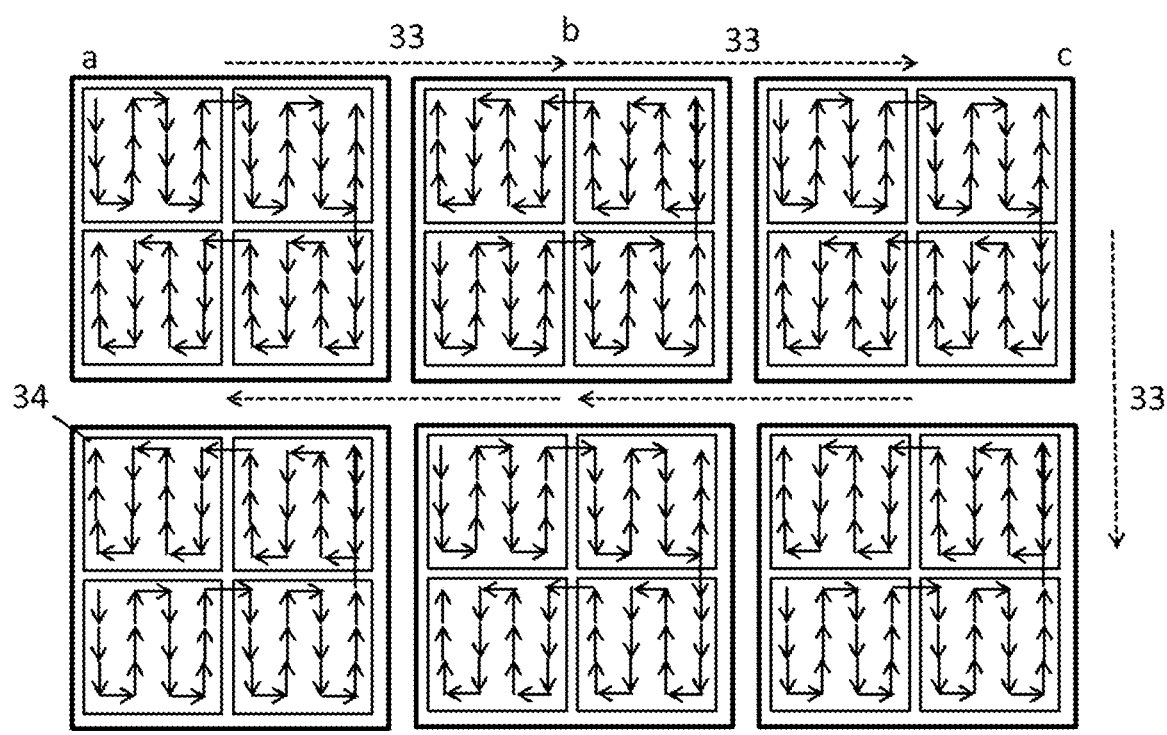
FIG. 3C shows further example patterns of non-rectilinear desorption paths of a desorbing beam across several area elements in one region, as well as the non-rectilinear trajectories across the regions containing the area elements, also in plan view.

FIG. 3C shows a further example embodiment for a pattern of sweeping and sampling of an area on a sample support divided up into regions and area elements contained therein. The explanations for FIG. 3B can easily be transferred to the embodiment in FIG. 3C and are not repeated here.

The invention has been described above with reference to different, specific example embodiments. It is to be understood, however, that various aspects or details of the embodiments described can be modified without deviating from the scope of the invention. The examples mention only pulsed operation of the desorbing beam, for example. Nevertheless, a steady or continuous operation is also compatible with the principles of the present disclosure, particularly in the case of SIMS ionization with a continuous primary ion beam. Furthermore, the features and measures disclosed in connection with different embodiments can be combined as desired if this appears practicable to a person skilled in the art. Moreover, the above description serves only as an illustration of the invention and not as a limitation of the scope of protection, which is exclusively defined by the appended claims, taking into account any equivalents which may possibly exist.

The invention claimed is:

1. A method for the analytical measurement of sample material which is deposited on a sample support surface, comprising the steps of:
   (a) defining a plurality of regions on the sample support surface that are in contact with the sample material,
   (b) sampling sections of the sample material on a first one of said regions using a desorbing beam to generate desorbed molecules, which are ionized and transferred to an analyzer, said sampling comprising sweeping the first region by changing an orientation setting of the desorbing beam relative to the sample support surface along a non-rectilinear trajectory selected from a plurality of predefined, non-rectilinear trajectories while keeping the sample support in one position, (c) transitioning to a newly-selected one of said regions using spatial adjustment of the sample support to reposition the sample support with the newly-selected one of the regions within a sweeping range of the desorbing beam, and sampling sections of the sample material on the newly-selected one of the regions as defined in step (b) for the first region, and (d) repeating step (c) until a predetermined termination condition is fulfilled.

2. The method according to claim 1, wherein the first region is swept between a first orientation and a last orientation of the desorbing beam relative to the sample support surface and, after the transitioning in step (c), a sweeping of the newly selected region begins with the last orientation of the desorbing beam.

3. The method according to claim 1, wherein the desorbing beam is an ion beam or a light beam.

4. The method according to claim 1, wherein each region has a plurality of area elements and the desorbing beam samples each area element along a desorption path selected from a plurality of predefined desorption paths.

5. The method according to claim 1, wherein the sample material comprises a tissue section.

6. The method according to claim 1, wherein the regions and/or the area elements have a polygonal contour.

7. The method according to claim 1, wherein the analyzer is a mobility analyzer, mass analyzer, or combined mobility-mass analyzer.

8. The method according to claim 1, wherein the orientation of the desorbing beam is changed using a plurality of deflection elements.

9. The method according to claim 1, wherein the trajectory selected contains a plurality of changes of direction on a region and/or on an area element.

10. The method according to claim 1, wherein the sample support is spatially adjusted using a translation stage.

11. The method according to claim 1, wherein information obtained with the analyzer from the sampled regions and/or area elements is joined together to form a spatial distribution map of ions, or molecular substrates on which they are based, across the sample material.

12. The method according to claim 1, wherein the termination condition is fulfilled when all regions and/or area elements are swept and sampled.

13. A system for the analysis of ions comprising an ion generation device and a control unit which is designed and configured to execute a method according to claim 1 on the ion generation device.

* * * * *